United States Patent [19]

Haruyama

[11] Patent Number: 4,611,861
[45] Date of Patent: Sep. 16, 1986

[54] LINEAR MOTION ROLLING CONTACT BEARING HAVING A DOUBLE ROW RUNWAY

[75] Inventor: Akira Haruyama, Tokyo, Japan

[73] Assignee: Nippon Thompson Co., Ltd., Tokyo, Japan

[21] Appl. No.: 788,317

[22] Filed: Oct. 17, 1985

[30] Foreign Application Priority Data

Oct. 18, 1984 [JP] Japan .................. 59-156357[U]

[51] Int. Cl.⁴ ............................................. F16C 29/04
[52] U.S. Cl. ........................................ 384/49; 384/18
[58] Field of Search ............. 308/6 R, 6 C, 3 R, 3 A, 308/3.8

[56] References Cited

U.S. PATENT DOCUMENTS

| 206,648 | 7/1878 | Tucker | 308/6 R |
| 2,563,370 | 8/1951 | Reese | 308/6 R X |
| 2,870,801 | 1/1959 | Cravens | 308/6 R X |
| 3,944,302 | 3/1976 | Fourrey | 308/6 R |
| 4,553,793 | 11/1985 | Teramachi | 308/6 R X |
| 4,569,563 | 2/1986 | Fourrey | 308/3.8 X |

FOREIGN PATENT DOCUMENTS

| 1462357 | 11/1966 | France | 308/6 R |
| 473026 | 10/1937 | United Kingdom | 308/6 R |
| 669664 | 4/1952 | United Kingdom | 308/6 R |

Primary Examiner—Stuart S. Levy
Assistant Examiner—Thomas R. Hannon
Attorney, Agent, or Firm—Alan H. MacPherson; Steven F. Caserza; Richard Franklin

[57] ABSTRACT

A linear motion rolling contact bearing assembly includes a U-shaped rail of thin steel plate, a U-shaped table of thin steel plate which straddles the rail, a plurality of rolling members interposed between the rail and the table and a retainer for retaining the rolling members in position. Each side wall of the rail is provided with a curved section having oppositely extending slopes on which a pair of upper and lower inner guide surfaces are defined. Each side wall of the table is also provided with a curved surface having a pair of upper and lower outer guide surfaces which are located opposite to the pair of inner guide surfaces of the rail. A first plurality of rolling members are provided as interposed between the upper inner and outer guide surfaces and a second plurality of rolling members are provided as interposed between the lower inner and outer guide surfaces. The retainer plate interposed between the side walls of the rail and the table is so structured to retain those first and second plurality of rolling members in position.

8 Claims, 7 Drawing Figures

LINEAR MOTION ROLLING CONTACT BEARING HAVING A DOUBLE ROW RUNWAY

BACKGROUND OF THE INVENTION

1. Field of the Invention

This invention relates to a linear motion rolling contact bearing assembly, and, in particular, to a linear motion rolling contact bearing assembly having a double row runway structure.

2. Description of the Prior Art

A linear motion rolling contact bearing assembly is well known in the art and it generally comprises an elongated bed or rail extending straight over a length, a table which straddles the straight rail and a plurality of rolling members interposed between the table and the rail, thereby allowing the table to move along the straight rail. In such a prior art linear motion rolling contact bearing assembly, the rail is typically comprised of a relatively thick steel plate which is formed by bending the thick steel plate so as to have a U-shaped cross section with a guide groove, serving as a runway, being formed on each outer side surface of its vertical walls. The rail thus formed to have a U-shaped cross section is set in position with its open side directed upward; and the table is structured, typically from a thick steel plate, to straddle the rail by transversely extending across the open side of the rail.

Such a prior art linear motion rolling contact bearing assembly is relatively high in rigidity as well as in accuracy; however, it is heavy in weight so that it is often the case that a deterioration in the accuracy of positioning is encountered if the bearing assembly is used in a high speed condition because the inertia can become significantly large. Besides, the prior art device is relatively expensive because it requires machining of a thick steel plate at high accuracy in manufacturing.

SUMMARY OF THE INVENTION

It is therefore a primary object of the present invention to provide an improved linear motion rolling contact bearing assembly.

Another object of the present invention is to provide a linear motion rolling contact bearing assembly simple in structure and thus easy to manufacture and light in weight.

A further object of the present invention is to provide a linear motion rolling contact bearing assembly including a rail and a table which may be comprised from a thin steel plate.

A still further object of the present invention is to provide a linear motion rolling contact bearing assembly low in inertia effect and thus high in performance even at high speed operation.

In accordance with the present invention, there is provided a linear motion rolling contact bearing assembly which comprises an elongated rail, a table which straddles the rail and a plurality of rolling members interposed between the rail and the table thereby allowing the table to move linearly along the rail. In the present device, both the rail and the table are preferably comprised of a thin steel plate so that the bearing assembly as a whole can be significantly light in weight. The rail is preferably comprised of a thin steel plate which is bent to define a channel having a U-shaped cross section. Thus, the rail typically includes a bottom wall and a pair of side walls extending upward from opposite sides of the bottom wall. Each of the side walls is particularly shaped to define a double row runway structure at its outer surface so that the rail typically has four runways in total, each runway presenting a straight track along which the rolling members roll. In one embodiment, each of the side walls is suitably bent to define a curved section, which may project either inwardly or outwardly, and a pair of runways are defined at the curved section as extending in parallel with the longitudinal axis of the rail. In another embodiment, each of the side walls is suitably processed or machined to define such a curved section.

The table is also preferably comprised of a thin steel plate, and it is typically constructed to have an inverted-U-shaped cross section. Thus, typically, the table has a top wall and a pair of side walls which extend downward from opposite sides of the top wall. The transverse distance between the side walls of the table is typically made slightly larger than the corresponding distance of the rail so that the table is provided to straddle the rail with the rolling members, balls or rollers, interposed between the table and the rail. Each of the side walls of the table is also suitably bent or machined corresponding in shape to the rail to define a curved section provided with a pair of runways each of which is located opposite to the corresponding one of the pair of runways of the rail. Thus, the present bearing assembly has four straight passages for rolling members, each of which is defined by a pair of opposite runways of the rail and the table. Preferably, each of the runways is defined by a straight groove having a circular arc cross section.

The present bearing assembly also includes a pair of retainer plates, each of which is disposed as interposed between the opposite side walls of the rail and the table for holding the rolling members in position. The retainer plate is preferably curved in compliance with the curved sections of the rail and the table and provided with retainer holes for rotatably holding each of the rolling members.

Other objects, advantages and novel features of the present invention will become apparent from the following detailed description of the invention when considered in conjunction with the accompanying drawings.

DESCRIPTION OF THE PREFERRED EMBODIMENTS

Figure 1:
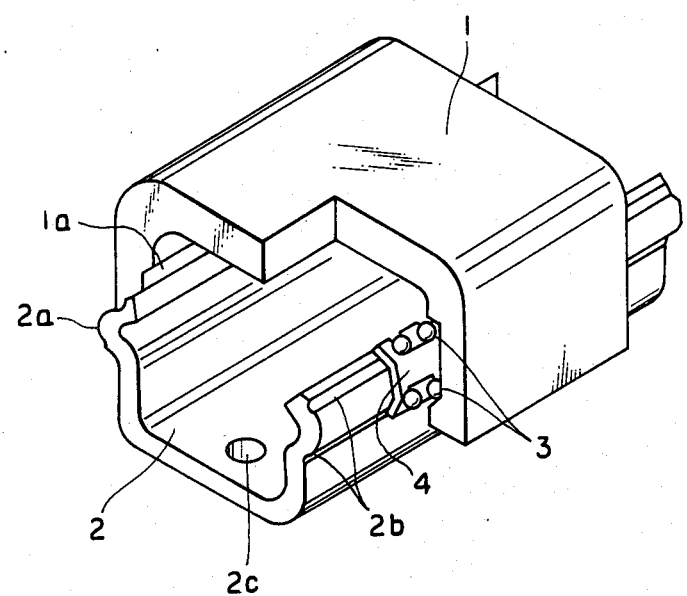
FIG. 1 is a partially cut-away, schematic, perspective view showing a linear motion rolling contact bearing assembly constructed in accordance with one embodiment of the present invention.
Figure 2:
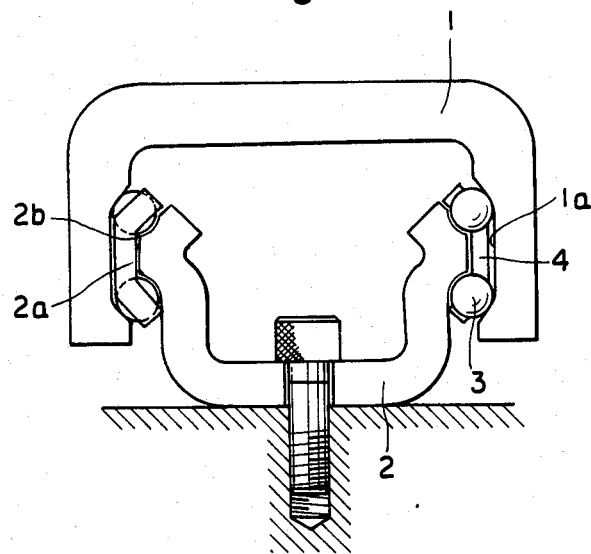
FIG. 2 is a transverse, schematic, cross-sectional view of the structure shown in FIG. 1.

Referring now to FIG. 1, there is shown a linear motion rolling contact bearing assembly constructed in accordance with one embodiment of the present invention. As shown, the present bearing assembly includes a table 1 which is preferably comprised of a thin steel plate and which has a cross section in the shape of an inverted U. Thus, the table 1 includes a flat top wall and a pair of side walls which extend downward from opposite sides of the top wall. As best shown in FIG. 2, the inner surface of each of the side walls of the table 1 is partly engraved to define an outer curved surface 1a generally in the shape of a sideways U in cross section. In the present embodiment, the outer curved surface 1a is generally concave and provided with a pair of upper and lower guide grooves for guiding the rolling motion of rolling members 3 or balls in the present embodiment.

The present bearing assembly also includes an elongated bed or rail 2 extending straight over a distance, which is preferably comprised of a thin steel plate and which has a U-shaped cross section. The rail 2 thus includes an elongated bottom wall and a pair of opposite side walls which extend upward from the opposite sides of the bottom wall. Each of the side walls of the rail 2 is particularly shaped to have a curved section 2a which projects outward in the illustrated embodiment. The outer surface of the outwardly projecting curved section 2a is provided with a pair of inner guide grooves 2b which are located on opposite slopes of the curved section 2a. Described more in detail, the curved section 2a is defined by bending part of the side wall of the rail 2 such that it extends in parallel with the longitudinal axis of the bearing assembly. In the present embodiment, the bottom wall of the rail 2 is provided with a plurality of mounting holes 2c, through which mounting bolts may extend to fix the rail 2 to a stationary object, such as a machine frame.

The provision of such a curved section 2a is advantageous because it provides stiffness or rigidity to the structure. A pair of inner guide grooves 2b preferably a circular arc in cross section are provided at the outer surface of the curved section 2a such that they are arranged on the opposite upper and lower curved slopes of the curved section 2a. Therefore, the upper inner and outer guide grooves are located in an opposed relation to define an upper passage for balls 3 and the lower inner and outer guide grooves are also located in an opposed relation to define a lower passage for balls 3. The transverse distance between the side walls of the rail 2 is slightly shorter than the transverse distance between the side walls of the table 1 so that, when assembled, the table 1 straddles the rail 2.

Figure 3:
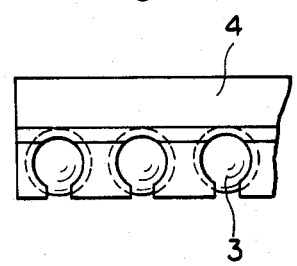
FIG. 3 is a fragmentary, schematic view showing how the balls 3 are retained by the retainer plate 4 which is employed in the structure shown in FIGS. 1 and 2.

As also shown in FIGS. 1 and 2, the present bearing assembly includes four trains of balls 3 as rolling members which are interposed between the opposed side walls of the table 1 and the rail 2. Each train of balls 3 is received in the guide passage defined between the pair of opposed runways or guide grooves. Also provided in the present bearing assembly is a pair of retainer plates 4 each of which is disposed as interposed between the opposed side walls of the table 1 and the rail 2. As best shown in FIG. 3, the retainer plate 4 is provided with a plurality of receiving holes along both sides thereof as spaced apart from each other at a predetermined pitch for receiving therein two trains of balls 3. The retainer plate 4 is generally shaped in compliance with the gap defined between the corresponding opposed side walls of the table 1 and the rail 2. In the illustrated embodiment, the retainer plate 4 includes a rectangular center section and a pair of bent side sections which are provided on opposite sides of the rectangular center section, whereby the receiving holes are defined in the side sections as best shown in FIG. 3.

With the structure described above, two trains of balls 3 are arranged at opposite slopes of the curved section 2a of the rail 2 and these two trains of balls 3 are maintained at the respective opposite slopes of the curved section 2a. As a result, the load per unit ball is reduced from that in a prior art structure having a single track and thus the frictional force encountered by each ball 3 is reduced, which allows to provide a relative motion between the table 1 and the rail 2 with a minimum of frictional resistance. Thus, the relative motion between the table 1 and the rail 2 in the present bearing assembly is quite smooth due to distribution of load. Moreover, the curved section 2a formed in each of the side walls of the rail 2 provides rigidity or stiffness to the rail 2. And, the table 1 is provided as straddling the rail 2 with the provision of a pair of trains of balls 3 on opposite slopes of the curved section 2a as interposed and in rolling contact with the corresponding opposed side walls of the table 1 and the rail 2, so that rigidity is also provided to the table 1. Accordingly, the present bearing assembly is high in rigidity or structural stiffness so that either one or both of the table 1 and the rail 2 may be formed from a thin steel plate. When so structured, the bearing assembly may be made extremely light in weight, which contributes to preventing the present bearing assembly from being adversely affected by inertia when operated at high speeds.

Figure 4:
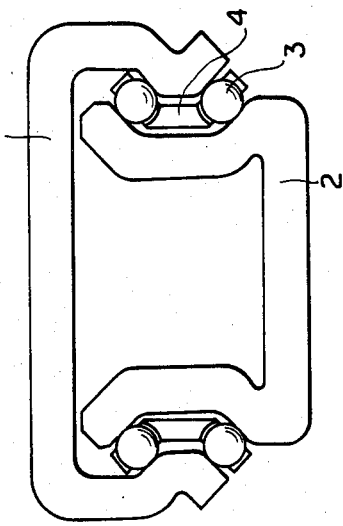
FIGS. 4 through 7 are transverse, schematic, cross-sectional views showing various modifications of the structure shown in FIGS. 1 through 3.

FIG. 4 schematically shows in transverse cross section another linear motion rolling contact bearing assembly constructed in accordance with another embodiment of the present invention. This bearing assembly is in many respects similar in structure to the previous embodiment shown in FIGS. 1 through 3, but it differs from the previous embodiment in that the side wall of the table 1 is bent differently. That is, each of the side walls of the table 1 of this embodiment includes a vertical side wall section and a pair of inclined side wall sections, whereby the inner surface of each of the inclined side wall section defines an outer guide surface along which the balls 3 may roll during a relative motion between the table 1 and the rail 2. If desired, this inner surface may be partly recessed to define an outer guide groove.

Figure 5:
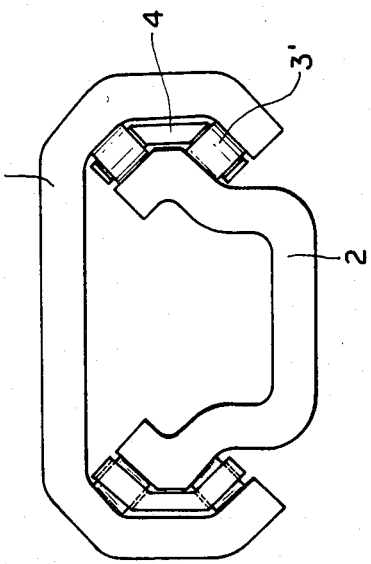
Figure 6:
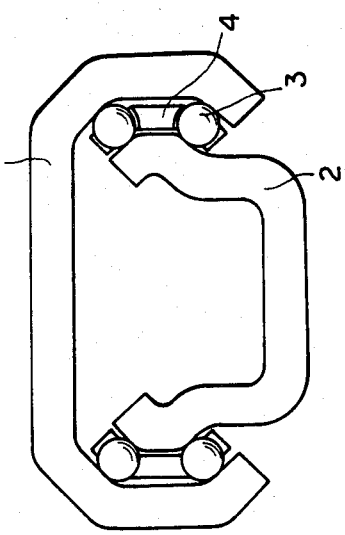
Figure 7:
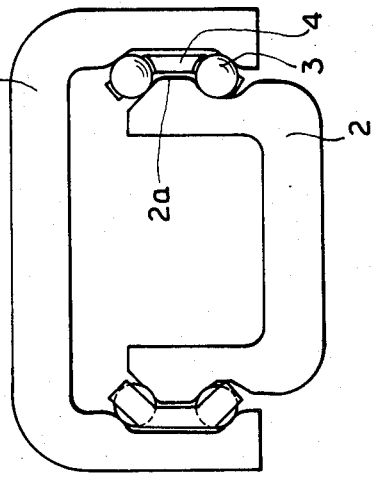

FIG. 5 schematically shows in transverse cross section a further embodiment of the present linear motion rolling contact bearing assembly. As shown in the FIG. 5 embodiment, the table 1 has a pair of side walls each of which is particularly shaped to define an inwardly projecting curved section and the rail 2 has a pair of side walls each of which is correspondingly shaped to define an inwardly projecting curved section so that the gap between the opposed side walls of the table 1 and the rail 2 is generally in the shape of a U placed on its side. FIG. 6 shows a still further embodiment of the present linear motion rolling contact bearing assembly. In this case, the rail 2 is comprised of a bottom wall and a pair of vertical side walls which extend upward from opposite sides of the bottom wall, whereby the outer surface of each of the vertical side walls is machined, e.g., by grinding, to define the outwardly projecting curved section 2a. The remaining structure is similar to that shown in FIG. 2. In order to form the outwardly projecting curved section 2a, a thin steel plate is first bent to define a U-shaped cross section, and, after heat treatment, the outer surface of each of the side walls is either ground or cut to form the outwardly projecting curved section 2a. When so formed, there may be obtained a linear motion rolling contact bearing assembly high in accuracy as well as in rigidity. FIG. 7 shows a still further embodiment of the present linear motion rolling contact bearing assembly which is basically similar in structure to the embodiment shown in FIG. 4 except that use is made of rollers 3' as rolling members instead of balls. With the use of rollers 3', the capacity of load may be increased.

As described above, in accordance with the present invention, use may be made of a thin steel plate in manufacturing a linear motion rolling contact bearing so that the resulting product may be significantly light in weight thereby allowing the bearing to operate at high speed without producing any undesired effect due to inertia. In addition, the present bearing assembly may be manufactured with ease, for example, by bending a thin steel plate into a U-shaped cross section using plastic deformation, and a high precision processing is only partly required if at all.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A linear motion rolling contact bearing assembly comprising:

an elongated rail having a bottom wall and a pair of inner side walls extending upward from opposite sides of the bottom wall thereby defining a generally U-shaped cross section, each of said inner side walls including a first curved section defined at its outer surface and provided with a pair of upper and lower first guide surfaces on opposite slopes of said curved section;

a table having a top wall and a pair of outer side walls extending downward from opposite sides of the top wall thereby defining a generally U-shaped cross section, each of said outer side walls being partly located opposite to the corresponding one of said pair of inner side walls and including a second curved section defined at its inner surface and provided with a pair of upper and lower second guide surfaces such that each of said pair of second guide surfaces is located opposite to the corresponding one of said pair of first guide surfaces;

a plurality of rolling members interposed between and in rolling contact with each pair of oppositely located first and second guide surfaces; and retaining means interposed between said inner and outer side walls for retaining said plurality of rolling members interposed between said upper first and second guide surfaces and said plurality of rolling members interposed between said lower first and second guide surfaces in position.

2. The assembly of claim 1 wherein said first curved surface projects outward with respect to the center axis of said rail and said second curved surface is generally in compliance with said first curved surface.

3. The assembly of claim 2 wherein said first curved surface is formed by bending part of said side wall.

4. The assembly of claim 2 wherein said first curved surface is formed by grinding or cutting part of said side wall.

5. The assembly of claim 1 wherein said first curved surface projects inward with respect to the center axis of said rail and said second curved surface is generally in compliance with said first curved surface.

6. The assembly of claim 1 wherein at least either one of said rail and table is formed from a thin steel plate.

7. The assembly of claim 1 wherein said rolling members are balls.

8. The assembly of claim 1 wherein said rolling members are rollers.

* * * * *